Patented Feb. 13, 1951

2,541,680

UNITED STATES PATENT OFFICE 2,541,680

REACTIVATION OF CATALYSTS CONTAINING IRON

Hans G. Vesterdal, Elizabeth, N. J., assignor to Standard Oil Development Company, a corporation of Delaware No Drawing. Application November 20, 1947, Serial No. 787,259

3 Claims. (Cl. 252—416)

The present invention relates to the dehydrogenation of mono-olefins and alkylated aromatics and, more particularly, it relates to the revivification of catalysts suitable for use in such dehydrogenation reactions.

The present application is a continuation-in-part of copending application Serial No. 468,689, filed December 11, 1942, now abandoned.

Recently, new catalysts have been found which are effective in the dehydrogenation of olefins, such as butylene, to form diolefins such as butadiene, and it has also been observed that these catalysts are active in promoting the dehydrogenation of the side-chains of alkylated aromatics, such as ethylbenzene to form styrene.

The catalysts referred to include those disclosed in U. S. Patents 2,370,797; 2,370,798; 2,395,875; 2,418,888 and 2,418,889 of Kenneth K. Kearby; U. S. Patent 2,392,750 of Norman F. Lin; and U. S. Patent 2,383,643 of Stewart C. Fulton and Kenneth K. Kearby. A representative catalyst composition is the following:

| Composition: | Per cent by weight |
|---|---|
| MgO | 70–80 |
| $Fe_2O_3$ | 15–20 |
| $K_2O$ | 4–5 |
| CuO | 4–5 |

Catalysts of the above type and others containing iron oxide may be reactivated or revivified after extended use in a dehydrogenation reaction by exposure to a gas containing CO at elevated temperatures, according to the present invention.

In view of the foregoing, the main object of this invention is to provide a method for revivifying catalysts containing iron oxide.

A more specific object of the invention is to provide a method adapted to revivify an iron containing catalyst in situ and at elevated temperatures without requiring the catalyst to be removed from the reactor for this treatment.

When conducting processes in which hydrocarbons are dehydrogenated using catalysts of the types mentioned above, the hydrocarbon is mixed with steam and passed over the catalyst at a rate of about 100 to 1000 volumes of hydrocarbon per volume of catalyst per hour and at a temperature within the range of about 1000° to 1600° F., usually between about 1100° F. and 1300° F., and at about atmospheric pressure. The ratio of steam to hydrocarbon is usually somewhere in the range of about 20:1 to 4:1. Depending on reaction conditions, the exact nature of the catalyst and other factors the period of operation before regeneration of the catalyst may lie within the time limits of ½ hour to about 10 hours. It is then necessary to regenerate the catalyst. This may be effected by shutting off the flow of hydrocarbon and passing steam or air or a mixture of steam and air through the catalyst mass while it is maintained in the temperature range of from about 1000° F. to about 1300° F. Following substantially complete removal of coke from the catalyst in this manner the flow of hydrocarbon and steam may again be resumed. After about 500 to 1000 or more of such cycles of reaction and regeneration it has been found that the activity of the catalyst tends to decrease appreciably.

Heretofore it has been found necessary, in order to revivify the catalyst, that is to restore its activity, to remove the catalyst from the reactor, permit it to cool, mix the catalyst mass thoroughly and then return it to the reactor. The exact reason why the removal and cooling of the catalyst followed by a remixing before returning the catalyst to the reactor brought about a reactivation is not known, but it is believed that this procedure caused a redistribution of the more active components of the catalyst. However, it has now been found that by employing the present process of revivification, a more effective restoration of the catalyst is brought about and, at the same time, the expenses resulting from the necessary labor and loss of time involved when using the previous procedure are eliminated. In the present process the catalyst is allowed to remain in the reactor and is merely contacted with a gas containing carbon monoxide whereby the activity of the catalyst is very effectively restored.

In operating this process the general procedure is about as follows: After the catalyst has shown a decrease in activity it is allowed to cool to the temperature range of about 200 to 500° F. Then a stream of gas containing carbon monoxide is passed through the catalyst for from ½ to about 5 hours after which the feed of carbon monoxide containing gas is cut off and the temperature of the catalyst is raised to a point somewhere above 1000° F. During the treatment with the carbon monoxide the feed rate of gas is not critical. It is merely important that sufficient carbon monoxide be present to give an atmosphere of CO. In order to facilitate the treatment it may in some cases be desirable to increase the pressure above atmospheric.

After the feed of carbon monoxide gas has been cut off the temperature can be raised as rapidly as is feasible. For this purpose steam may be passed through the catalyst or it may be advisable to start the heating with methane or other gas until a temperature is reached which is above the condensation temperature of steam after which steam alone is passed in to raise the temperature to the desired level. Other gases may also be used in place of steam for raising the catalyst temperature. These would include such gases as $CO_2$, nitrogen, flue gas and the like. Carbon monoxide may also be employed for this purpose. However, it is preferable to use steam since subsequently when the dehydrogenation step is again resumed the hydrocarbons are ordinarily diluted with steam in order to lower the partial pressure of the hydrocarbons, this reduction in partial pressure being desirable in order to counteract or minimize side reactions such as polymerization with consequent lowering of yields. Hence it is desirable that the reactor contain steam at the beginning of the productive phase.

The new process may be illustrated by the following test. In this test the catalyst employed was one containing, in parts by weight, 78.5 MgO, 20 $Fe_2O_3$, 5 CuO, 5 $K_2O$, which catalyst had been used for butene dehydrogenation in a run lasting for about 1900 hours and which was considered spent because it did not respond to the usual reactivation procedure which consisted in cooling the catalyst and removing it from the reactor, remixing the mass of material and returning it to the reactor. The catalyst was allowed to remain in the unit and was permitted to cool from the reaction temperature of 1200° F. down to about 800° F. and carbon monoxide was then passed over the catalyst in the reaction zone and cooling was continued to about 200° F. The temperature was again raised to about 400° F. before the stream of carbon monoxide was cut off. The catalyst was then heated further to 1000° F. in the presence of the residual atmosphere of carbon monoxide after which the temperature was raised from 1000° F. up to 1200° F. in an atmosphere of steam.

On making a butene dehydrogenation run with this reactivated catalyst, a conversion of about 16% was obtained when operating at 1205° F. with 565 v./v./hr. butene feed rate and 7000 v./v./hr. of steam. This compares to a conversion of about 10 to 10.5% before the reactivation when operating at a slightly higher temperature (1219° F.) and with a lower feed rate (437 v./v./hr.) as shown in the following summary table:

*Butene dehydrogenation*

Catalyst: 78.5 parts $M_3O$; 20 parts $Fe_2O_3$; 5 parts CuO; 5 parts $K_2O$
One hour cycles: ½ Hr. Butene+Steam, ½ Hr. Steam Purging

| Cycle No. | [1] 1738 | [2] 1887 |
|---|---|---|
| Catalyst Temperature, °F | 1,219 | 1,205 |
| Butene Feed Rate, V./V./Hr.[3] | 437 | 565 |
| Steam Feed Rate, V./V./Hr | 6,050 | 7,000 |
| Per Cent Conversion | 10.51 | 15.96 |
| Per Cent Conversion to CO+$CO_2$ | 0.53 | 0.83 |
| Per Cent Conversion to Butadiene | 8.45 | 13.05 |
| Per Cent Selectivity | 80.6 | 81.8 |

[1] Before reactivation.
[2] After reactivation with CO.
[3] Volumes of gas per volume of catalyst per hour.

Although in the above example carbon monoxide was introduced during the period of cooling of the catalyst this procedure is not essential. The carbon monoxide was introduced here during the cooling period merely as an expedient to hasten cooling. One could use air or another gas instead or could merely allow the catalyst to cool of its own accord. When carbon monoxide is employed to hasten the cooling step, it is advisable to allow the catalyst to cool spontaneously or with the aid of steam or inert gases to at least 800° F. before the carbon monoxide is introduced in order that carbon deposition will be avoided.

The important part of the process is the treating of the catalyst with carbon monoxide at temperatures at least below 800° F. and preferably in the range of 200° up to 500° F. followed by reheating of the catalyst up to temperatures above 1000° F. and preferably up to the usual reaction temperature which is in the neighborhood of 1100° to 1300° F. Depending upon how much the catalyst has become deactivated the treatment with carbon monoxide may last anywhere from 30 minutes up to 24 hours. Ordinarily the carbon monoxide treatment will last from about 2 hours to about 6 hours, more or less.

It is not necessary that the carbon monoxide regenerating gas be the pure compound for it may be mixed with minor quantities of steam, nitrogen, $CO_2$, flue gas and the like. Thus, practically any commercially available gas mixture in which the major component is carbon monoxide may be employed in the present process.

In some instances gas mixtures in which carbon monoxide is present in as low a concentration as 30% may be employed, but in general it is preferable that higher concentration than this be used, i. e., 50% or more CO, in order that the process may be conducted on an efficient basis.

Although it has been indicated that the treatment with carbon monoxide may be conducted at atmospheric pressure it is also possible to conduct the process under a positive pressure of 2 to 3 or more atmospheres. In such a case it may be possible to conduct the CO treatment at higher temperatures, that is, as high as 700° to 800° F. rather than the 200 to 500° F. indicated for operation at atmospheric pressure. In general, no advantage will be gained by operating at less than atmospheric pressure. However, it is not intended that the process be limited in this respect and if desired the reaction may be conducted at less than atmospheric pressure.

The process is, in a limited sense, applicable to the regeneration of catalysts containing the following:

| Component | Per Cent by Weight |
|---|---|
| Base—MgO, ZnO, BeO or $ZnO_2$ | 50–97 |
| Active Component—Iron Oxide (expressed as $Fe_2O_3$) | 3–50 |
| Promoter—$K_2O$, $Na_2O$, CaO or SrO | 0.5–15 |
| Stabilizer—CuO, NiO or $Al_2O_3$ | 0.5–20 |

The above list of components is merely representative. Other bases, promoters and stabilizers will be found mentioned in the issued patents referred to earlier in this specification. A typical example of a suitable catalyst is one containing 80 parts by weight of magnesium oxide, 20 parts by weight of $Fe_2O_3$, 5 parts by weight of $K_2O$ and 5 parts by weight of CuO. In some cases the promotor and stabilizer are omitted from the catalyst which would then consist of only the base and the effective component, namely $Fe_2O_3$. Also, some catalysts are improved in activity by including a fifth component, namely about 1% of silica gel, that is, the catalyst would contain 1% of silica gel and 99% of the components mentioned above.

Although in all of the examples the iron oxide content has been expressed as per cent or parts of $Fe_2O_3$ it is not to be understood that this is the only oxide of iron that may be employed. $FeO$ and $Fe_3O_4$ may also be used. It is probable that no matter which oxide is employed at the start an equilibrium of the various oxides of iron is set up during use of the catalyst. Some free iron may also be present. The iron oxide content is expressed in terms of $Fe_2O_3$ merely for convenience.

In its broadest aspect, the present process is applicable to the reactivation of any catalyst containing iron oxide as an effective catalyst component and is therefore applicable to the reactivation of iron oxide itself. The process is particularly adapted for use in the revivification of multi-component catalysts containing iron oxide, a promoter and a stabilizer, as hereinbefore indicated.

To recapitulate, this invention involves revivification of catalysts containing iron oxide as an effective catalyst component by treating the catalysts with CO. The catalyst is reactivated by a mechanism which is believed to involve carbonyl formation, i. e. iron carbonyl, at the lower temperatures, which carbonyl is decomposed at the higher temperatures to form a very active oxide or mixture of oxides of iron, and probably also pyrophoric iron. However, it is not intended that the invention be limited by any theories regarding the mechanism involved in this improved reactivation reaction.

Heretofore, it was noted that when the activity of the catalyst decreased, it was restored in part by removing it from the reactor, cooling, remixing the catalyst mass and again placing it in the reactor. But there comes a time in the life of the catalyst when such handling is no longer effective to restore the activity of the catalyst. One valuable feature of the present invention resides in the fact that a catalyst may be reactivated which no longer responds to the treatment involving removal of the catalyst and cooling and remixing of the same.

Although the character of the invention and the manner in which it is to be performed have been clearly set forth in the preceding specification and examples it is to be understood that the invention is not to be limited to the specific illustrations given, for many modifications will be obvious to those skilled in this particular art.

What is claimed is:

1. The process for reactivating an iron oxide catalyst containing a potassium compound promoter used in dehydrogenating a hydrocarbon from the class consisting of butene and ethyl benzene in the presence of steam at 1000° F. to 1600° F. and repeatedly regenerated to remove coke deposits by contact with an oxidizing gas at 1000° F. to 1300° F., said catalyst containing as its effective components, iron oxide promoted by a minor amount of the potassium compound promoter, and said catalyst being deactivated by the repeated regeneration, which comprises treating said used and deactivated catalyst with carbon monoxide at a temperature between 200° F. and 800° F. and subsequently heating the thus treated catalyst to above 1000° F. in the presence of steam so that the iron in the catalyst remains in the oxide form before it is again used and during its use in the dehydrogenating set forth.

2. In the process as described in claim 1, treating said used and deactivated catalyst with carbon monoxide between 200° F. and 500° F. for a period of one-half hour to 24 hours.

3. In the process defined in claim 1, said catalyst after being reactivated, containing as its effective components, iron oxide of the composition $Fe_2O_3$ promoted by the potassium compound which amounts to between 0.5 to 15% of $K_2O$.

HANS G. VESTERDAL.

REFERENCES CITED

The following references are of record in the file of this patent:

UNITED STATES PATENTS

| Number | Name | Date |
| --- | --- | --- |
| 2,242,387 | Boyd | May 30, 1941 |
| 2,251,554 | Sobel et al. | Aug. 5, 1941 |
| 2,276,921 | Brown | Mar. 17, 1942 |
| 2,366,531 | Ipatieff et al. | Jan. 2, 1945 |
| 2,383,643 | Fulton et al. | Sept. 28, 1945 |
| 2,451,040 | Murphree | Oct. 12, 1948 |